Figure 3:
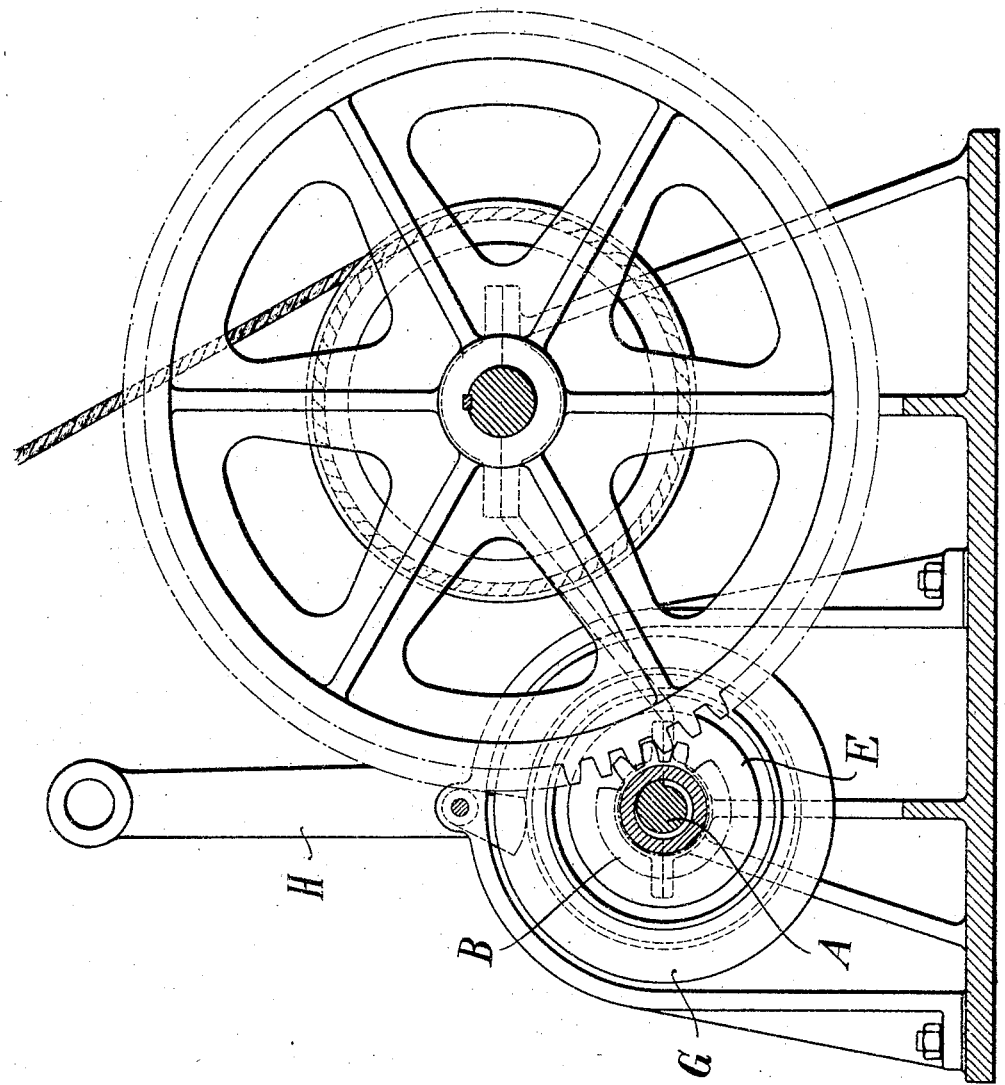

No. 774,850. PATENTED NOV. 15, 1904.
W. MAYER.
AUTOMATIC WHEEL BRAKE FOR LIFTS.
APPLICATION FILED JAN. 26, 1904.
NO MODEL. 2 SHEETS—SHEET 1.
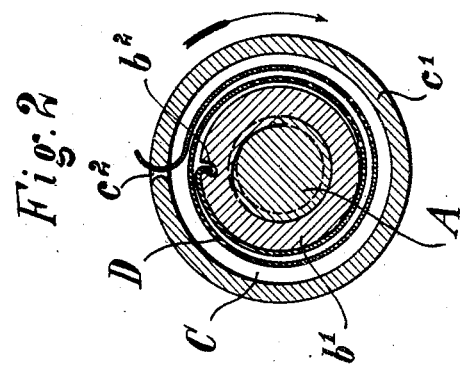
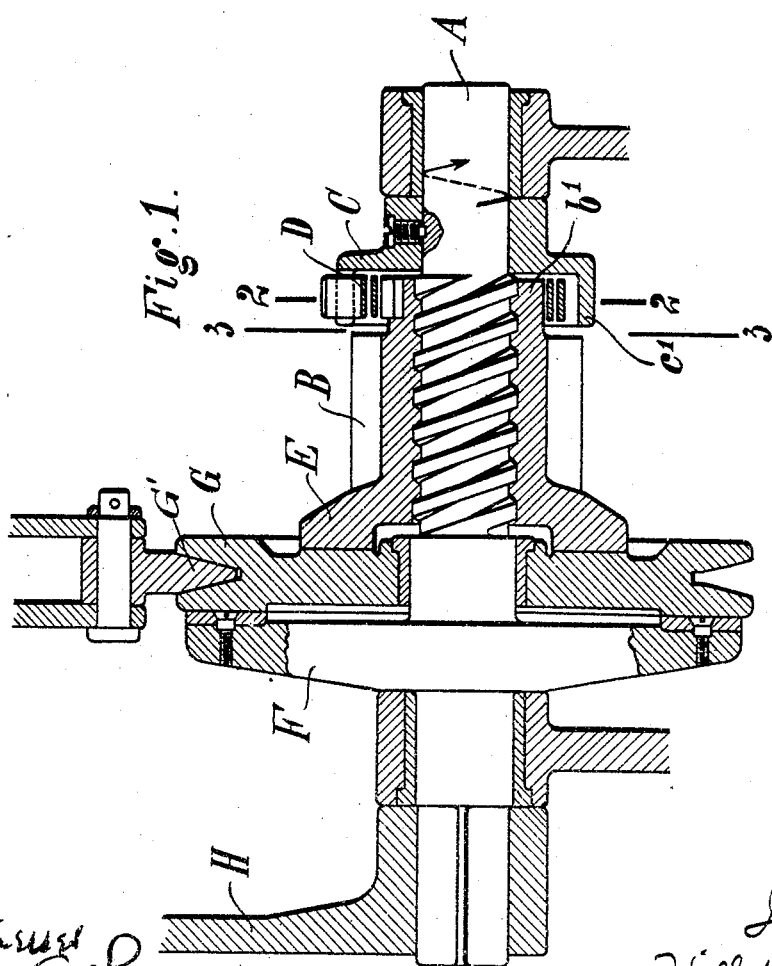

No. 774,850. PATENTED NOV. 15, 1904.
W. MAYER.
AUTOMATIC WHEEL BRAKE FOR LIFTS.
APPLICATION FILED JAN. 26, 1904.
NO MODEL. 2 SHEETS—SHEET 2.

No. 774,850.

Patented November 15, 1904.

UNITED STATES PATENT OFFICE.

WILHELM MAYER, OF RÜTTENSCHEID, NEAR ESSEN-ON-THE-RUHR, GERMANY, ASSIGNOR TO FRIED. KRUPP, AKTIENGESELLSCHAFT, OF ESSEN-ON-THE-RUHR, GERMANY.

AUTOMATIC WHEEL-BRAKE FOR LIFTS.

SPECIFICATION forming part of Letters Patent No. 774,850, dated November 15, 1904.

Application filed January 26, 1904. Serial No. 190,652. (No model.)

*To all whom it may concern:*

Be it known that I, WILHELM MAYER, a subject of the Emperor of Germany, and a resident of Rüttenscheid, near Essen-on-the-Ruhr, Germany, have invented certain new and useful Improvements in Automatic Wheel-Brakes for Lifts, of which the following is a specification.

This invention relates to automatic gear-wheel brakes of the kind in which during the winding up of the load the gear-wheel is coupled to the working shaft by means of two clutch-faces, which are screwed one against the other by the pull of the load being wound up in order to prevent the free descent of the load, while by reverse rotation of the working shaft the clutch-faces are separated sufficiently to permit the load to descend, but still prevent it from overtaking the unwinding action. Brake-couplings of this kind, especially those in hoists driven by hand, however, do not afford sufficient security against excessively-rapid descent of the load. If, for instance, the threads of the pressure-screw are fouled and the friction in the screw device consequently increased, it may happen in case of accidental releasing of the operating-handle during descent of the load that the working shaft is driven at uncontrollable speed, so that the brake is released and the load falls.

The invention has for its object to provide greater security during the lowering of the load, and the said object is chiefly attained by the employment of a spring, one end of which is connected with the working shaft, while the other end is attached to the part capable of being moved longitudinally by the screw under the pull of the load. The said spring continuously tends to cause relative turning between the said two parts in a direction that forces one against the other and coupling of the gear-wheel to the working shaft.

In the drawings forming part of this specification one embodiment of the invention is shown by way of illustration, Figure 1 being a vertical section through the gear-wheel brake, Fig. 2 a cross-section taken on line 2 2, Fig. 1, and seen from the left, and Fig. 3 a cross-section of the gear-wheel brake on a reduced scale and a portion of the driven gear, one winding member being also shown.

The construction and operation of gear-wheel brakes of the same general type as the present invention are well understood, and it will therefore be necessary to describe but briefly these parts.

A indicates a drive-shaft which is rotated in either direction by the operating-handle H. Turning with the shaft A is a friction-disk F, while a wheel G is loosely journaled on said shaft A. When the load is to be raised, the handle H is turned so as to clamp the wheel G between the disks E and F, and the wedging-dog $G'$, disposed above the wheel G, is so inclined that it permits the wheel G to turn with the disks E and F. However, when the handle is released the wedging-dog holds the wheel G stationary, and as the disks E and F are in frictional contact with the same the load is held against movement. When it is desired to lower the load, the handle H is turned in a reverse direction, thereby withdrawing the friction-disk E from engagement with the wheel G, which is now stationary owing to the disposition of the dog $G'$, and the load is free to be lowered; but this lowering takes place only so long as the handle is turned in this direction and is supposed to stop upon the withdrawal of the hand from the operating-handle by reason of the fact that the gear meshing with the pinion B is turned by the weight of the load in a direction to cause the friction engagement.

On the working or drive shaft A adjacent to the gear-wheel B, which drives the winding member, is located a sleeve C, the flange $c'$ of which surrounds the nave $b'$ of the driving-wheel B, leaving an intermediate space between said flange and said nave. In this intermediate space is arranged a spiral spring D, one end of which projects into a groove $b^2$ in the nave $b'$, while the other end projects into an aperture $c^2$ in the sleeve-flange $c'$. The spring is wound in such a manner that it tends to turn the shaft A in the direction of the arrow in Figs. 1 and 2, and thus screw it into the driving-wheel B from left to right, Fig. 1. The strength of this spring is so determined that it will without fail overcome the friction of the threads (even when they are foul) in addition to the friction of the bearings of the working shaft. When the braking is reduced for lowering the load, the spring D, between the working shaft A and the driving-wheel B, has a continuous turning moment, such that if the operating-handle H were suddenly released the spring would screw the working shaft A into the driving-wheel B, thereby pressing the friction-disk F against the stationary wheel G, braking the working shaft A and preventing it from following the driving-wheel B at the same speed or overtaking it. In consequence of this and of the pull of the load the stationary wheel G will be pressed between the two friction-disks E F and the load thus arrested in its descent.

If the threads of the working shaft were of very steep pitch, the spiral spring could be substituted by an axially-working spiral or disk-spring, one end of which would bear against the driving-wheel B and the other against a band or abutment ring on the shaft A.

Having thus described the invention, the following is what is claimed as new therein:

In an automatic brake for hoists the combination of the driving-wheel and the working shaft in screw-threaded engagement, friction-faces coupling said wheel and shaft together when the wheel rotates in advance of the shaft under the pull of the load, but releasing when the shaft is rotated equally with or in advance of the gear-wheel, and a spring interposed between the wheel and the shaft and tending to cause relative rotation between them in the direction to force the friction-faces together.

The foregoing specification signed at Düsseldorf this 9th day of January, 1904.

WILHELM MAYER.

In presence of—
  WILLIAM ESSENWEIN,
  PETER LIEBER.